(12) United States Patent
Tarren et al.

(10) Patent No.: US 11,675,650 B2
(45) Date of Patent: Jun. 13, 2023

(54) SYSTEM AND METHOD FOR N-MODULAR REDUNDANT COMMUNICATION

(71) Applicant: MISSION SECURE, INC., Charlottesville, VA (US)

(72) Inventors: Jacob Tarren, Richmond, VA (US); Austin Charles Suhler, Charlottesville, VA (US); Cameron Patrick Calpin, Charlottesville, VA (US); Rick A. Jones, Charlottesville, VA (US)

(73) Assignee: MISSION SECURE, INC., Charlottesville, VA (US)

( * ) Notice: Subject to any disclaimer, the term of this patent is extended or adjusted under 35 U.S.C. 154(b) by 0 days.

(21) Appl. No.: 17/513,399

(22) Filed: Oct. 28, 2021

(65) Prior Publication Data
US 2022/0206885 A1 Jun. 30, 2022

Related U.S. Application Data

(60) Provisional application No. 63/132,030, filed on Dec. 30, 2020.

(51) Int. Cl.
*G06F 11/07* (2006.01)
*H04L 9/08* (2006.01)
*H04W 84/18* (2009.01)

(52) U.S. Cl.
CPC ........ *G06F 11/079* (2013.01); *G06F 11/0724* (2013.01); *G06F 11/0751* (2013.01); *H04L 9/0841* (2013.01); *H04W 84/18* (2013.01)

(58) Field of Classification Search
CPC . G06F 11/0724; G06F 11/0751; G06F 11/079
See application file for complete search history.

(56) References Cited

U.S. PATENT DOCUMENTS

| | | | |
|---|---|---|---|
| 2019/0079831 A1* | 3/2019 | Madduri | G06F 16/273 |
| 2019/0265971 A1* | 8/2019 | Behzadi | G06Q 10/06 |
| 2020/0076586 A1* | 3/2020 | Zhang | H04L 9/3239 |
| 2020/0272945 A1* | 8/2020 | Manamohan | G06N 20/10 |

OTHER PUBLICATIONS

International Search Report issued in Intl. Appln. No. PCT/US2021/063445 dated Feb. 25, 2022.
Written Opinion issued in Intl. Appln. No. PCT/US2021/063445 dated Feb. 25, 2022.

* cited by examiner

*Primary Examiner* — Nadeem Iqbal
(74) *Attorney, Agent, or Firm* — Rossi, Kimms & McDowell LLP

(57) ABSTRACT

A fault tolerant consensus generation and communication system and method is described. Each processing node in the system receives a plurality of measurements from a sensor, calculates a consolidated value for the received plurality of measurements, transmits the consolidated value to other processing nodes, receives consolidated values from the other processing nodes, calculates a consensus value based on the calculated consolidated value and the received one or more consolidated values, transmits the calculated consensus value to the other processing nodes, receives consensus values from the other processing nodes, generates a consensus message based on the calculated consensus value, the received one or more consensus values, and a predefined criterion, and, in a case where the consensus message is not present in a consensus queue, adds the consensus message to the consensus queue.

20 Claims, 5 Drawing Sheets

SYSTEM AND METHOD FOR N-MODULAR REDUNDANT COMMUNICATION

CROSS REFERENCE TO RELATED APPLICATIONS

This application claims the priority benefit of U.S. Provisional Application No. 63/132,030 filed Dec. 30, 2020, the entire disclosure of which is hereby incorporated herein by reference.

TECHNICAL FIELD

Aspects of this document relate generally to systems and methods for implementing fault tolerant communication channels, and more particularly to an n-modular redundancy framework for detecting or preventing errors in sensor information received over a communication channel.

BACKGROUND

Control systems rely on a plurality of sensors, operating independently or semi independently of each other, to provide information on an operating state of the environment controlled by the control system. The control system includes signal transmission and data communication techniques to, preferably, provide secure and reliable communication of information from the sensors. The plurality of sensors may be grouped into a plurality of sensor groups controlled by a plurality of peer nodes ("nodes"), each sensor group containing one or more sensors controlled by a peer node, thus forming a sensor network. The sensor network can perform independent redundant measurements of the operating state of an environment. Wired or wireless networks may be used to connect the peer nodes and the sensors in the sensor network to a central processing node, permitting communication within the sensor network and between the sensor network and the central processing node, while maintaining the independence of the peer nodes from each other.

The control system may include multiple peer nodes that are connected through various communication channels to each other and to the central processing node so that information can be transmitted from one peer node to another or to the central processing node. Each peer node or processing node may include a receiver which only receives information from one or more other linked devices, a transmitter which only sends information to one or more other linked devices, or a transceiver which can operate as both a receiver and a transmitter. In communication terminology, such a system is essentially a communication network of communication nodes that are interconnected by hard-wired or wireless communication channels or links, where each node operates as a communication device or information processing device.

One desirable feature of these control systems is system reliability against one or more faults or failures of nodes and communication channels in an Information System. One way to achieve such reliability is to make the Information System "partially fault-tolerant" so that the overall Information system can continue to operate, even in the presence of some types of faults, to meet the system specification without failure of the entire system. Such a fault in a node or a communication channel may be caused by software, hardware, or a combination of both. While some faults may have accidental on unintentional causes, a malicious entity could also deploy intentional hardware or software based attacks.

Conventionally a "partially fault-tolerant" Information System requires each sensor or peer node to provide information on the operating state of the environment to a central processing node. The central processing node receives information from each of the peer nodes, or sensors, resolves conflicts in the information received, and performs one or more actions in response to the received sensor information. Fault tolerance, in this approach, is achieved only within the scope of redundancy measurements and communications between the sensor network and the central processing node, but the central processing node itself remains a single point of failure. This approach requires large amounts of communication to be performed within the control system. Moreover, the central processing node needs complex programming logic to resolve inconsistencies and conflicts within the sensor data received from individual sensors, sensor groups, or peer nodes.

Accordingly, there is a need for a more advantageous approach where the sensor network resolves any conflicts in sensor data within the sensor network itself and communicates a consensus data stream of sensor information to the central processing node. This approach reduces communication overhead between the sensor network and the central processing node, and simplifies the programming logic for the central processing node.

SUMMARY

At least the above-discussed need is addressed, and technical solutions are achieved in the art by various embodiments of the present invention. In one aspect of the present invention a communication and consensus calculation system comprises one or more computer accessible storage devices configured to store instructions and one or more processors communicatively connected to each other and to the one or more computer accessible storage devices and configured to execute the stored instructions to provide a plurality of processing nodes. In some aspects of the invention, each processing node of the plurality of processing nodes is configured to receive a plurality of measurements from a sensor of a plurality of sensors; calculate a consolidated value for the received plurality of measurements; transmit the consolidated value to other processing nodes of the plurality of processing nodes; receive one or more consolidated values from one or more of the other processing nodes of the plurality of processing nodes; calculate a consensus value based on the calculated consolidated value and the received one or more consolidated values; transmit the calculated consensus value to the other processing nodes of the plurality of processing nodes; receive one or more consensus values from one or more of the other processing nodes of the plurality of processing nodes; generate a consensus message based on the calculated consensus value, the received one or more consensus values, and a predefined criterion; and in a case where the consensus message is not present in a consensus queue, add the consensus message to the consensus queue.

In some aspects of the invention, the plurality of processing nodes is provided by software running on the one or more processors.

In some aspects of the invention, each processing node of the plurality of processing nodes is further configured to attach signature information identifying the processing node to the calculated consolidated value.

In some aspects of the invention, each processing node of the plurality of processing nodes is further configured to attach signature information identifying the processing node to the calculated consensus value.

In some aspects of the invention, each processing node of the plurality of processing nodes is further configured to attach signature information of all processing nodes having a same consensus value as the calculated consensus to the consensus message.

In some aspects of the invention, each processing node of the plurality of processing nodes is further configured to receive at least a predefined number of measurements from the sensor before calculating the consolidated value.

In some aspects of the invention, each processing node of the plurality of processing nodes is further configured to receive at least a predefined number of consolidated values from one or more of the other processing nodes of the plurality of processing nodes before calculating the consensus value.

In some aspects of the invention, each processing node of the plurality of processing nodes is further configured to receive at least a predefined number of consensus values from one or more of the other processing nodes of the plurality of processing nodes before generating the consensus message.

In some aspects of the invention, the predefined criterion is a same consensus value, and the generated consensus message identifies one or more processing nodes that have the same consensus value.

In some aspects of the invention, the one or more processors are further configured to execute the stored instructions to identify a processing node of the plurality of processing nodes that does not share a same consensus value as a majority of other processing nodes of the plurality of processing nodes as a faulty processing node.

In another aspect of the invention, a processor-executable method of calculating and communicating a consensus comprises, for each processing node of a plurality of processing nodes, receiving a plurality of measurements from a sensor of a plurality of sensors; calculating a consolidated value for the received plurality of measurements; transmitting the consolidated value to other processing nodes of the plurality of processing nodes; receiving one or more consolidated values from one or more of the other processing nodes of the plurality of processing nodes; calculating a consensus value based on the calculated consolidated value and the received one or more consolidated values; transmitting the calculated consensus value to the other processing nodes of the plurality of processing nodes; receiving one or more consensus values from one or more of the other processing nodes of the plurality of processing nodes; generating a consensus message based on the calculated consensus value, the received one or more consensus values, and a predefined criterion; and in a case where the consensus message is not present in a consensus queue, adding the consensus message to the consensus queue.

In some aspects of the invention, the method further comprises, for each processing node, attaching signature information identifying the processing node to the calculated consolidated value.

In some aspects of the invention, the method further comprises, for each processing node, attaching signature information identifying the processing node to the calculated consensus value.

In some aspects of the invention, the method further comprises, for each processing node, attaching signature information of all processing nodes having a same consensus value as the calculated consensus to the consensus message.

In some aspects of the invention, the method further comprises, for each processing node, receiving at least a predefined number of measurements from the sensor before calculating the consolidated value.

In some aspects of the invention, the method further comprises, for each processing node, receiving at least a predefined number of consolidated values from one or more of the other processing nodes of the plurality of processing nodes before calculating the consensus value.

In some aspects of the invention, the method further comprises, for each processing node, receiving at least a predefined number of consensus values from one or more of the other processing nodes of the plurality of processing nodes before generating the consensus message.

In some aspects of the invention, the predefined criterion is a same consensus value, and the generated consensus message identifies one or more processing nodes that have the same consensus value.

In some aspects of the invention, the method further comprises identifying a processing node of the plurality of processing nodes that does not share a same consensus value as a majority of other processing nodes of the plurality of processing nodes as a faulty processing node.

In another aspect of the invention, a non-transitory computer readable storage medium is configured to store a program that executes the method of calculating and communicating a consensus according to previously described aspects of the invention.

Various embodiments of the present invention may include systems, devices, or machines that are or include combinations or subsets of any one or more of the systems, devices, or machines and associated features thereof summarized above or otherwise described herein.

BRIEF DESCRIPTION OF DRAWINGS

Embodiments will be discussed hereafter using reference to the included drawings, briefly described below, wherein like designations refer to like elements. It is to be understood that the attached drawings are for purposes of illustrating aspects of various embodiments and can include elements that are not to scale.

DETAILED DESCRIPTION

Figure 1:
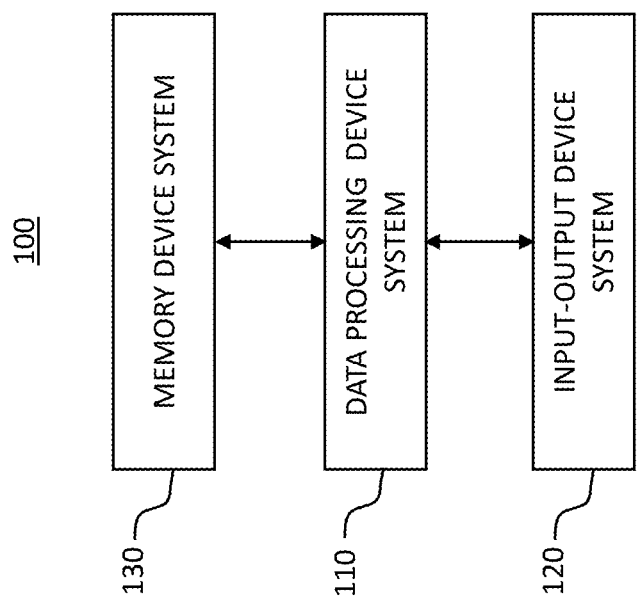
FIG. 1 shows a computing device system, according to embodiments of the invention.

Implementations/embodiments disclosed herein (including those not expressly discussed in detail) are not limited to the particular components or procedures described herein. Additional or alternative components, assembly procedures, and/or methods of use consistent with the intended systems & methods for synchronous automated generation of operative reports may be utilized in any implementation. This may include any materials, components, sub-components, methods, sub-methods, steps, and so forth.

As used herein, the term "input field" includes a "selector." For example, a button or space on a user interface in which a user may move a cursor to and click to make a selection, and a checkbox field, and other similar fields, as well as alphanumeric input fields, are all "input fields" as used herein.

A Byzantine Fault is typically considered a failure condition of distributed computing systems, where one or more components either fail or act maliciously and there is imperfect information on whether or not any component has entered a failed state. The goal of the distributed computing system is most often to collaborate on a given data set and form a consensus. Components may enter/exit a failed state multiple times, and as the operational components have no way of determining if their peer nodes are in a failed state, their data cannot be implicitly trusted. A Byzantine Fault Tolerant System is one in which less than half of the components are able to fail (or act maliciously) without affecting the system's overall ability to communicate internally to form a consensus.

In some embodiments, a fault tolerant communication system provides a highly scalable and bandwidth/resource efficient communication mechanism that is completely Byzantine Fault Tolerant ("BFT") for comparing multiple unique measured values across multiple fully independent peers within a networked system (also referred to as a distributed computing system). Each peer node reads from one or more sensors that may or may not be unique to that peer node and communicates with all other peer nodes to derive a consensus value for a dynamically determined consensus slice derived from the sensor value ingestion using a combination of tunable parameters. Communication bandwidth usage outside of the system of peer nodes is minimal. An outside observer is able to determine the full set of consensus values and their corresponding peer nodes using less bandwidth than it would take by communicating with each peer node within the system. It should be noted that the invention is not limited to these or any other examples provided herein, which are referred to for purposes of illustration only. It should also be noted that the terms "peer node", "node", and "peer" are used interchangeably in this specification to specify a peer node.

In this regard, in the descriptions herein, certain specific details are set forth in order to provide a thorough understanding of various embodiments of the invention. However, one skilled in the art will understand that the invention may be practiced at a more general level without one or more of these details. In other instances, well-known structures have not been shown or described in detail to avoid unnecessarily obscuring descriptions of various embodiments of the invention.

Any reference throughout this specification to "one embodiment", "an embodiment", "an example embodiment", "an illustrated embodiment", "a particular embodiment", and the like means that a particular feature, structure, or characteristic described in connection with the embodiment is included in at least one embodiment. Thus, any appearance of the phrase "in one embodiment", "in an embodiment", "in an example embodiment", "in this illustrated embodiment", "in this particular embodiment", or the like in this specification is not necessarily all referring to one embodiment or a same embodiment. Furthermore, the particular features, structures or characteristics of different embodiments may be combined in any suitable manner to form one or more other embodiments.

Unless otherwise explicitly noted or required by context, the word "or" is used in this disclosure in a non-exclusive sense. In addition, unless otherwise explicitly noted or required by context, the word "set" is intended to mean one or more. For example, the phrase, "a set of objects" means one or more of the objects.

In the following description, some embodiments of the present invention may be implemented at least in part by a data processing device system configured by a software program. Such a program may equivalently be implemented as multiple programs, and some or all of such software program(s) may be equivalently constructed in hardware.

Further, the phrase "at least" is or may be used herein at times merely to emphasize the possibility that other elements may exist beside those explicitly listed. However, unless otherwise explicitly noted (such as by the use of the term "only") or required by context, non-usage herein of the phrase "at least" nonetheless includes the possibility that other elements may exist besides those explicitly listed. For example, the phrase, 'based at least on A' includes A as well as the possibility of one or more other additional elements besides A. In the same manner, the phrase, 'based on A' includes A, as well as the possibility of one or more other additional elements besides A. However, the phrase, 'based only on A' includes only A. Similarly, the phrase 'configured at least to A' includes a configuration to perform A, as well as the possibility of one or more other additional actions besides A. In the same manner, the phrase 'configured to A' includes a configuration to perform A, as well as the possibility of one or more other additional actions besides A. However, the phrase, 'configured only to A' means a configuration to perform only A.

The word "device", the word "machine", the word "system", and the phrase "device system" all are intended to include one or more physical devices or sub-devices (e.g., pieces of equipment) that interact to perform one or more functions, regardless of whether such devices or sub-devices are located within a same housing or different housings. However, it may be explicitly specified according to various embodiments that a device or machine or device system resides entirely within a same housing to exclude embodiments where the respective device, machine, system, or device system resides across different housings. The word "device" may equivalently be referred to as a "device system" in some embodiments.

Further, the phrase "in response to" may be used in this disclosure. For example, this phrase may be used in the following context, where an event A occurs in response to the occurrence of an event B. In this regard, such phrase includes, for example, that at least the occurrence of the event B causes or triggers the event A.

The phrase "derivative thereof" and the like is or may be used herein at times in the context of a derivative of data or information merely to emphasize the possibility that such data or information may be modified or subject to one or more operations. For example, if a device generates first data for display, the process of converting the generated first data into a format capable of being displayed may alter the first data. This altered form of the first data may be considered a derivative of the first data. For instance, the first data may be a one-dimensional array of numbers, but the display of the first data may be a color-coded bar chart representing the numbers in the array. For another example, if the above-mentioned first data is transmitted over a network, the process of converting the first data into a format acceptable for network transmission or understanding by a receiving device may alter the first data. As before, this altered form of the first data may be considered a derivative of the first data. For yet another example, generated first data may undergo a mathematical operation, a scaling, or a combining with other data to generate other data that may be considered derived from the first data. In this regard, it can be seen that data is commonly changing in form or being combined with other data throughout its movement through one or more data processing device systems, and any reference to information or data herein is intended to include these and like changes, regardless of whether or not the phrase "derivative thereof" or the like is used in reference to the information or data, unless otherwise required by context. As indicated above, usage of the phrase "or a derivative thereof" or the like merely emphasizes the possibility of such changes. Accordingly, the addition of or deletion of the phrase "or a derivative thereof" or the like should have no impact on the interpretation of the respective data or information. For example, the above-discussed color-coded bar chart may be considered a derivative of the respective first data or may be considered the respective first data itself.

The term "program" in this disclosure should be interpreted to include one or more programs including as a set of instructions or modules that may be executed by one or more components in a system, such as a controller system or data processing device system, in order to cause the system to perform one or more operations. The set of instructions or modules may be stored by any kind of memory device, such as those described subsequently with respect to the memory device system 130, 251, or both, shown in FIGS. 1 and 2, respectively. In addition, this disclosure may describe or similarly describe that the instructions or modules of a program are configured to cause the performance of an action. The phrase "configured to" in this context is intended to include at least (a) instructions or modules that are presently in a form executable by one or more data processing devices to cause performance of the action (e.g., in the case where the instructions or modules are in a compiled and cleartext form ready for execution), and (b) instructions or modules that are presently in a form not executable by the one or more data processing devices, but could be translated into the form executable by the one or more data processing devices to cause performance of the action (e.g., in the case where the instructions or modules are encrypted in a non-executable manner, but through performance of a decryption process, would be translated into a form ready for execution). Such descriptions should be deemed to be equivalent to describing that the instructions or modules are configured to cause the performance of the action. The word "module" may be defined as a set of instructions. The word "program" and the word "module" may each be interpreted to include multiple sub-programs or multiple sub-modules, respectively. In this regard, reference to a program or a module may be considered to refer to multiple programs or multiple modules.

Further, it is understood that information or data may be operated upon, manipulated, or converted into different forms as it moves through various devices or workflows. In this regard, unless otherwise explicitly noted or required by context, it is intended that any reference herein to information or data includes modifications to that information or data. For example, "data X" may be encrypted for transmission, and a reference to "data X" is intended to include both its encrypted and cleartext forms, unless otherwise required or indicated by context. However, non-usage of the phrase "or a derivative thereof" or the like nonetheless includes derivatives or modifications of information or data just as usage of such a phrase does, as such a phrase, when used, is merely used for emphasis.

Further, the phrase "graphical representation" used herein is intended to include a visual representation presented via a display device system and may include computer-generated text, graphics, animations, or one or more combinations thereof, which may include one or more visual representations originally generated, at least in part, by an image-capture device.

Figure 4:
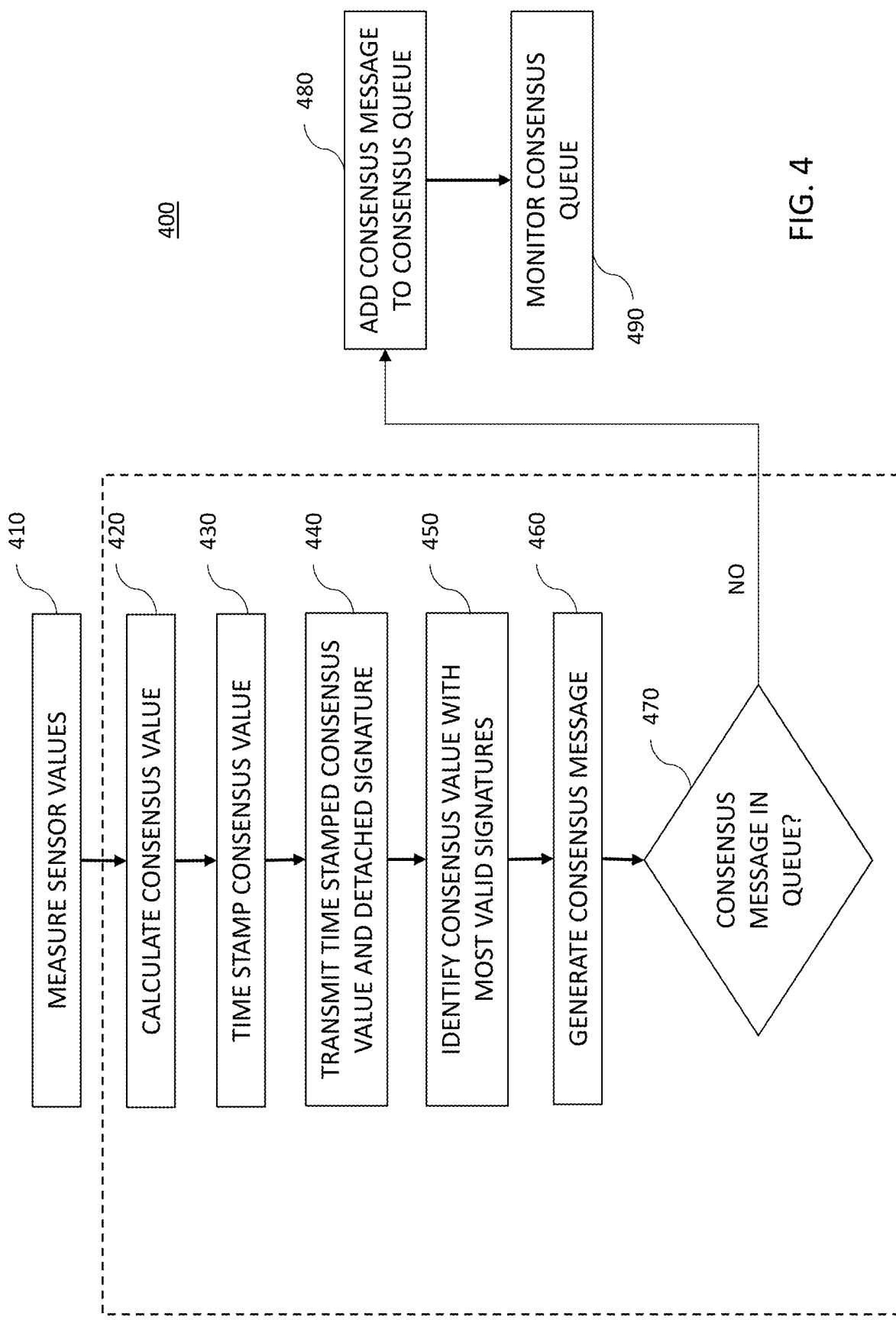
FIG. 4 is a flowchart showing a method of generating consensus within a sensor network and communicating the consensus information to a central processing node, according to some embodiments of the present invention.

Further still, example methods are described herein with respect to FIG. 4. Such figures are described to include blocks associated with computer-executable instructions. It should be noted that the respective instructions associated with any such blocks herein need not be separate instructions and may be combined with other instructions to form a combined instruction set. The same set of instructions may be associated with more than one block. In this regard, the block arrangement shown in method FIG. 4 herein is not limited to an actual structure of any program or set of instructions or required ordering of method tasks, and such method FIG. 4, according to some embodiments, merely illustrates the tasks that instructions are configured to perform, for example upon execution by a data processing device system in conjunction with interactions with one or more other devices or device systems.

Figure 2:
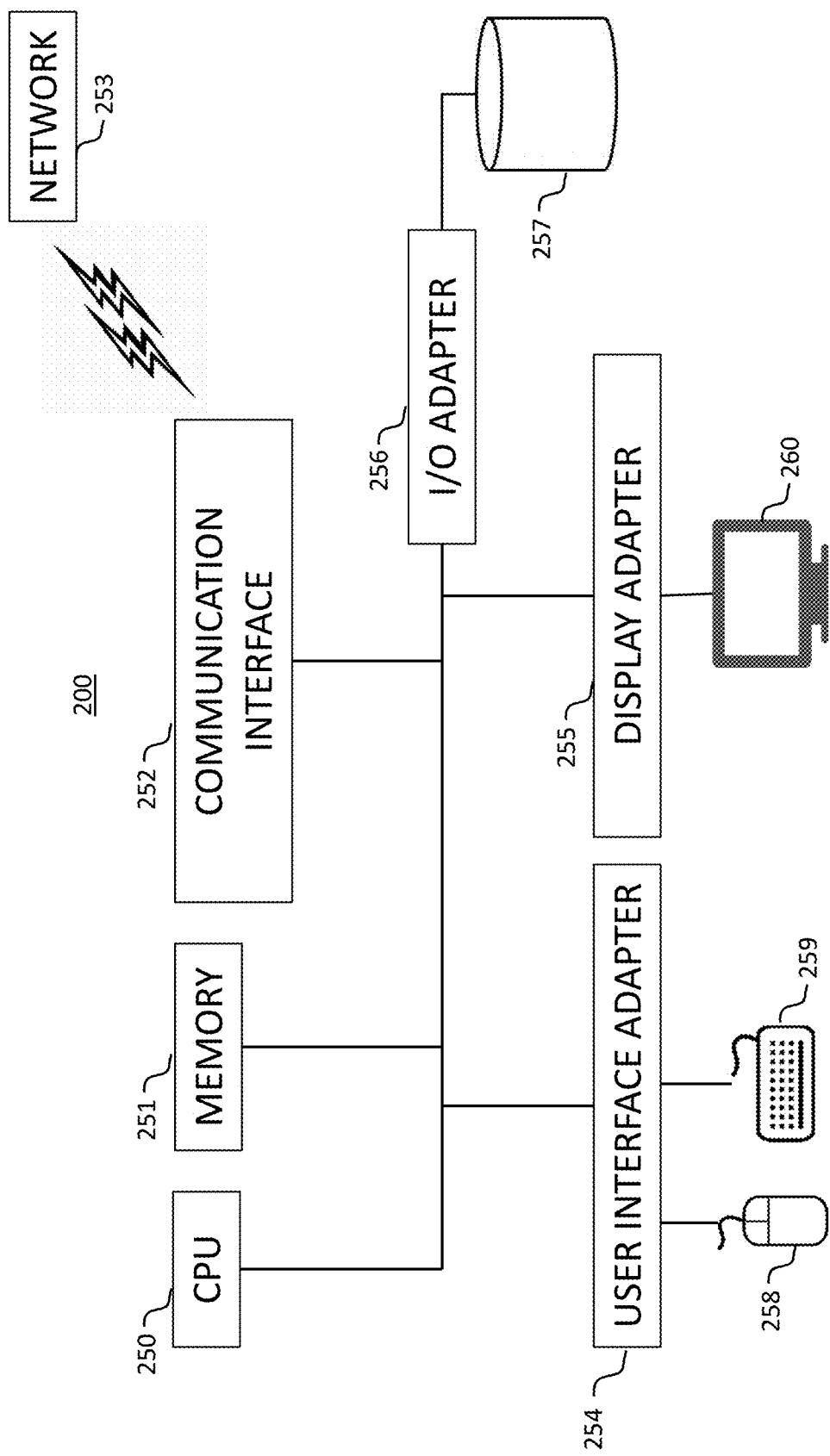
FIG. 2 shows another computing device system, according to embodiments of the invention.

FIG. 1 schematically illustrates a system 100 according to some embodiments. In some embodiments, the system 100 may be a computing device 100 (as shown in FIG. 2). In some embodiments, the system 100 includes a data processing device system 110, an input-output device system 120, and a processor-accessible memory device system 130. The processor-accessible memory device system 130 and the input-output device system 120 are communicatively connected to the data processing device system 110.

The data processing device system 110 includes one or more data processing devices that implement or execute, in conjunction with other devices, such as one or more of those in the system 100, control programs associated with some of the various embodiments. Each of the phrases "data processing device", "data processor", "processor", and "computer" is intended to include any data processing device, such as a central processing unit ("CPU"), a desktop computer, a laptop computer, a mainframe computer, a tablet computer, a personal digital assistant, a cellular phone, and any other device configured to process data, manage data, or handle data, whether implemented with electrical, magnetic, optical, biological components, or other.

The memory device system 130 includes one or more processor-accessible memory devices configured to store information, including the information needed to execute the control programs associated with some of the various embodiments. The memory device system 130 may be a distributed processor-accessible memory device system including multiple processor-accessible memory devices communicatively connected to the data processing device system 110 via a plurality of computers and/or devices. On the other hand, the memory device system 130 need not be a distributed processor-accessible memory system and, consequently, may include one or more processor-accessible memory devices located within a single data processing device.

Each of the phrases "processor-accessible memory" and "processor-accessible memory device" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs. In some embodiments, each of the phrases "processor-accessible memory" and "processor-accessible memory device" is intended to include a non-transitory computer-readable storage medium. In some embodiments, the memory device system 130 can be considered a non-transitory computer-readable storage medium system.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the memory device system 130 is shown separately from the data processing device system 110 and the input-output device system 120, one skilled in the art will appreciate that the memory device system 130 may be located completely or partially within the data processing device system 110 or the input-output device system 120. Further in this regard, although the input-output device system 120 is shown separately from the data processing device system 110 and the memory device system 130, one skilled in the art will appreciate that such system may be located completely or partially within the data processing system 110 or the memory device system 130, depending upon the contents of the input-output device system 120. Further still, the data processing device system 110, the input-output device system 120, and the memory device system 130 may be located entirely within the same device or housing or may be separately located, but communicatively connected, among different devices or housings. In the case where the data processing device system 110, the input-output device system 120, and the memory device system 130 are located within the same device, the system 100 of FIG. 1 can be implemented by a single application-specific integrated circuit (ASIC) in some embodiments.

The input-output device system 120 may include a microphone, a speaker, a mouse, a keyboard, a touch screen, another computer, or any device or combination of devices from which a desired selection, desired information, instructions, or any other data is input to the data processing device system 110. The input-output device system 120 may include any suitable interface for receiving information, instructions or any data from other devices and systems described in various ones of the embodiments.

The input-output device system 120 also may include an image generating device system, a display device system, a speaker device system, a processor-accessible memory device system, or any device or combination of devices to which information, instructions, or any other data is output from the data processing device system 110. In this regard, if the input-output device system 120 includes a processor-accessible memory device, such memory device may or may not form part or all of the memory device system 130. The input-output device system 120 may include any suitable interface for outputting information, instructions or data to other devices and systems described in various ones of the embodiments. In this regard, the input-output device system may include various other devices or systems described in various embodiments.

FIG. 2 shows an example of a computing device system 200, according to some embodiments. The computing device system 200 may include a processor 250, corresponding to the data processing device system 110 of FIG. 1, in some embodiments. The memory 251, input/output (I/O) adapter 256, and non-transitory storage medium 257 may correspond to the memory device system 130 of FIG. 1, according to some embodiments. The user interface adapter 254, mouse 258, keyboard 259, display adapter 255, and display 260 may correspond to the input-output device system 120 of FIG. 1, according to some embodiments. The computing device 200 may also include a communication interface 252 that connects to a network 253 for communicating with other computing devices 200.

FIG. 4 includes respective data generation and flow diagrams, which may implement various embodiments of method 400 by way of associated computer-executable instructions according to some example embodiments. In various example embodiments, a memory device system (e.g., memory device system 130) is communicatively connected to a data processing device system (e.g., data processing device systems 110, otherwise stated herein as "e.g., 110") and stores a program executable by the data processing device system to cause the data processing device system to execute various embodiments of method 400. In these various embodiments, the program may include instructions configured to perform, or cause to be performed, various ones of the instructions associated with execution of various embodiments of method 400. In some embodiments, method 400 may include a subset of the associated blocks or additional blocks than those shown in FIG. 4. In some embodiments, method 400 may include a different sequence indicated between various ones of the associated blocks shown in FIG. 4.

Figure 3:
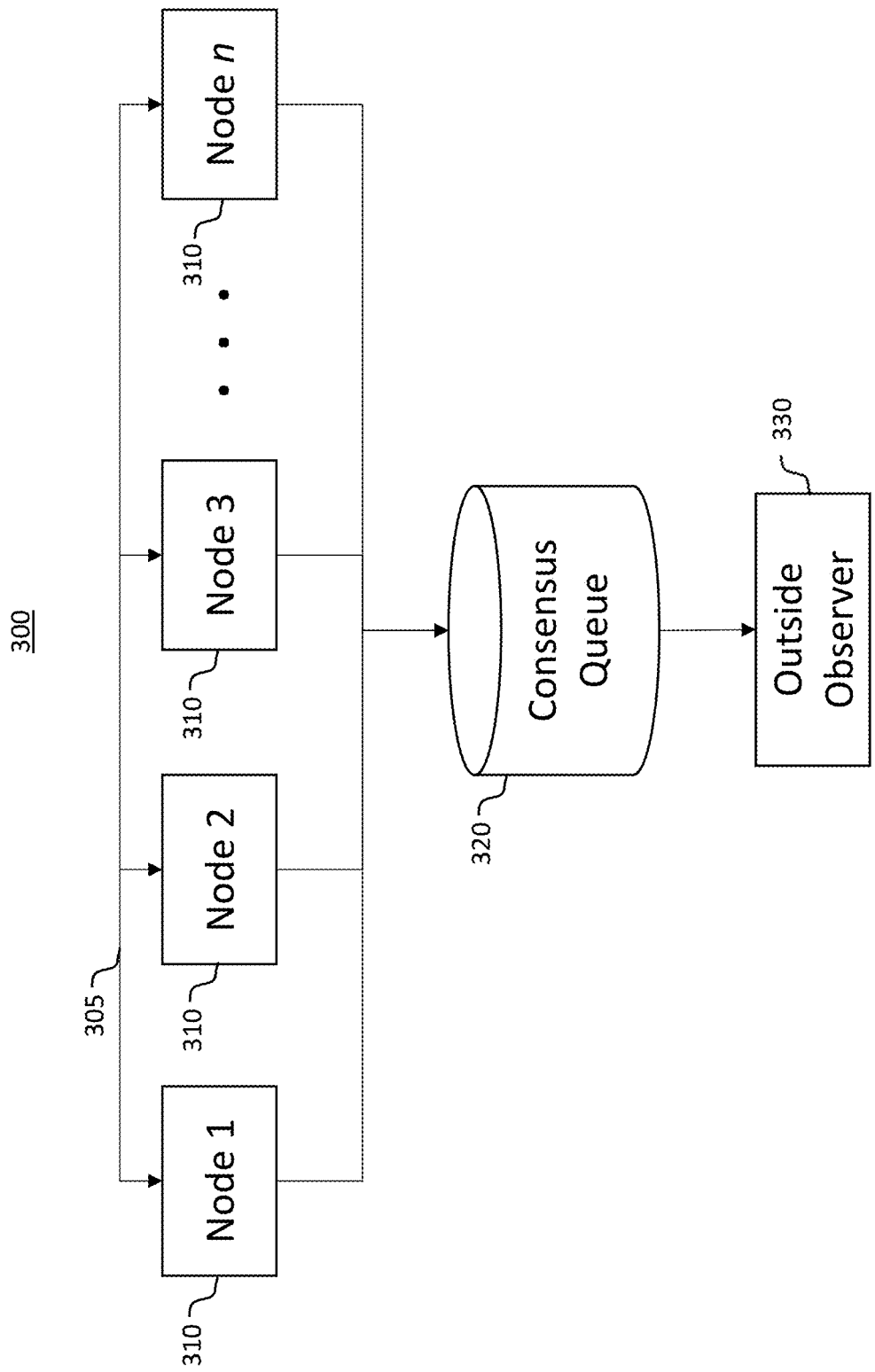
FIG. 3 shows an overview of a fault tolerant communication system, according to embodiments of the invention.

According to some embodiments of the present invention, the system 100 includes some or all of the communication and consensus calculation system 300 shown in FIG. 3, or vice versa. In this regard, FIG. 3 illustrates a communication and consensus calculation system 300, according to some embodiments of the present invention. The communication and consensus calculation system 300, may be a particular implementation of the system 100, according to some embodiments.

In some embodiments of the invention, the communication and consensus calculation system 300 is implemented by the computing device 200. In some embodiments, the communication and consensus calculation system 300 includes an n-Module Redundancy (nMR) communication system for communication of sensor data and consensus calculation. In some embodiments of the invention, the nMR system 300 is a fully distributed Byzantine Fault Tolerant (BFT) system of n nodes 310, connected by a shared bus 305, in which components may fail and there is imperfect information on whether a component has failed. In some embodiments, other communication protocols, such as a local area network, may be used instead of the shared bus 305 to connect the nodes 310.

In some embodiments of the invention, each node 310 of the nMR system 300 measures one or more data points (x) from one or more sensor types, such as GPS, barometric pressure, camera gimbal positioning, etc., with each sensor measuring one of the data points. In some embodiments of the invention, each node 310 reports the data point x measured by that node to the other nodes 310 within the nMR system 300 using the shared bus 305. In some embodiments of the invention, the nMR system 300 calculates a consensus value (c) for all data points x measured by nodes 310 in a given time period p, and reports the consensus value to an outside observer 330 via a consensus queue 320.

In some embodiments of the invention, some nodes 310 may measure multiple data points simultaneously, and each data point type may have unique consensus rules. In some embodiments of the invention, nodes may experience any combination of the following issues while measuring data points in addition to any normally expected failure modes:

Each measurement of a data point x may occur at a unique frequency.

Each measurement of a data point x may result in an x value from an unknown length of time in the past (j). This may result in a node that is continuously submitting x values from (current time−j).

In some embodiments of the invention, at any given time, some of the nodes 310 may collude or fail to simultaneously or independently report a fraudulent data point x. In some embodiments of the invention, the number of colluding nodes is less than half ((n/2)−1). In some embodiments of the invention, the nMR system 300 calculates whether any nodes 310 have shown consistent deviation from the consensus values. In some embodiments of the invention, the nMR system 300 reports any findings regarding the consistent deviation via a special additional message to a potentially different outside observer.

To provide robust performance against various types of attacks, including replay attacks, in some embodiments of the invention, timestamps, sequence numbers, or some variation thereof may be added to the meta data of messages to differentiate the messages between the nodes 310 and given time period p.

Many systems that could greatly benefit from the inclusion of nMR such as Unmanned Arial Systems (UAS), Remotely Operated Vehicles (ROV), or more conventional Industrial Control Systems (ICS) operate with unique mission critical requirements. Often times, these systems are designed to be as compact and lightweight as possible, especially when the system is intended to be mobile. Any system which is responsible for generating its own electrical power or operates exclusively off stored electrical power must take electrical power draw requirements into account when adding new components.

Although conventional BFT solutions exist for communicating messages from a system to an outside observer, none of the conventional solutions are appropriate within the unique confines of control systems, because of the control system's limitations on bandwidth and size, weight, and power (SWaP).

To provide true fault tolerance, a conventional solution that relies on a single consensus calculation node to aggregate all reported data points (x values), calculate the consensus values, and report the consensus values to the outside observer is unacceptable. The nMR system 300, discussed in this application, provides a fully distributed mechanism that does not rely on a leader node for determining consensus and reporting it to the outside observer, further differentiating it from conventional BFT communication systems.

In some embodiments of the invention, at system initialization, the outside observer 330 may connect directly to the network of nodes 310 for key generation and exchange to perform authentication and secure communication. In some embodiments of the invention, the system may use, for example, the Extended Triple Diffie-Hellman key agreement protocol (E3DH).

Public key cryptography will typically be used to ensure the security and confidentiality of data transmitted within the system and to the outside observer. Each node and the outside observer generate a new private/public key pair at system initialization and share copies of their public keys with all nodes and the outside observer. All communications to each node and the outside observer signed with the sources private key and then encrypted with the destinations public key. This ensures that the receiver is able to verify that the data came from the expected source, and that the destinations private key must be used to decrypt and read the data.

Perfect Forward Security (PFS) prevents an attacker from using previously transmitted data to gain information about the encryption mechanism by requiring all entities in the system to generate and use new keys for every transaction. This may be achieved by connecting the outside observer to the system to perform a key-sharing and handshake protocol, such as Diffie-Hellman or RSA handshake, to share newly generated public keys. In implementations where symmetric cryptograph is preferred, E3DH may be used to generate and share a High Entropy "Master" Key. Regardless of the key generation and sharing mechanism, the old keys should be properly erased to ensure an attacker is not able to retrieve information about previously used keys. In some embodiments, a sodium_memzero mechanism of ensuring proper erasure of sensitive data provided by the Libsodium programming library may be utilized to achieve appropriate security. In some embodiments of the invention, keys are reused until the system reinitializes, and PFS is not maintained within the scope of an individual operation.

In some embodiments of the invention, a physical cable may be used to connect the outside observer to the system during the handshaking or shared key generation process to mitigate any attempted eavesdropping. If the handshaking or shared key generation is done over a wireless connection or with any component within either the outside observer or the nMR system connected via a conventional Internet, it would be possible for an external entity to capture all information transmitted. Though, currently, there appear to be no known methods of breaking the security provided by the aforementioned mechanisms, it is foreseeable that one may be developed in the future. Preventing the handshake or key generation information from being shared outside of the confines of the system would help ensure the PFS of data transmitted within and out of the nMR system.

FIG. 4 shows a flowchart for a fault tolerant method 400 of generating and communication consensus information from a network of sensor nodes to an outside observe, according to some embodiments of the invention. In some embodiments of the invention, in step 410, nodes 310 receive measured values for data points x during a given time period p. Steps 420-470 are repeated by every node 310 for every time period p. In some embodiments of the invention, in step 420, each node 310 reviews every submitted data point x and calculates a consensus value c for each data point type in the system 300. In some embodiments of the invention, there may be a plurality of types of data points measured by different types of sensors, for example GPS or barometer. In some embodiments of the invention, each node 310 may measure one or more types of data points of the plurality of types of data points.

In some embodiments of the invention, in step 430, each node 310 appends the timestamp of the current time period p (referred to as T(p)) to each consensus value c, creating a time stamped measured consensus value {c,T(p)} for each data point type. In some embodiments of the invention, in step 440, each node 310 transmits all time stamped measured consensus values {c,T(p)}s and a calculated detached signature (DS({c,T(p)})) for each data point type to the other nodes 310 system 300. All nodes are preferably connected to all other nodes via a communication protocol such as an IP network. In some embodiments of the invention, the mechanism used to transmit data from one node to another may be an implementation of the MQTT messaging protocol, such as RabbitMQ or ZeroMQ.

In some embodiments of the invention, in step 450, the method includes determining which time stamped measured consensus value $\{c,T(p)\}$ has the most valid detached signatures $DS(\{c,T(p)\})$s from known and unique nodes 310. In some embodiments of the invention, in step 460, the method includes appending all valid detached signatures to generate a consensus message (cm). In some embodiments of the invention, a node 310 is required to have at least a majority $((n/2)+1)$ valid detached signatures $DS(\{c,T(p)\})$s to generate a consensus message cm for any given data point type.

At this point in the method, all nodes 310 have time stamped measured consensus values $\{c,T(p)\}$ and detached signatures $DS(\{c,T(p)\})$ for every data point type. Assuming no errors or fraudulent/rogue nodes, each node will have generated the same consensus message cm for all data points of a given type.

In some embodiments of the invention, in step 470, each node 310 checks whether its consensus message cm exists in a consensus queue Qc. If the consensus message cm does not exist in the consensus queue Qc, in step 480, the node 310 transmits its generated consensus message cm to the consensus queue Qc. If the consensus message cm exists in the consensus queue Qc, no message is transmitted by the node 310.

In some embodiments of the invention, in step 490, an outside observer 330 monitors the consensus queue Qc to identify the consensus message cm, at a given time period p, that includes the most valid and unique detached signatures $DS(\{c,T(p)\})$s of known nodes 310 within the system. The identified consensus message cm is considered to represent the true measured value for that data point type at the time period p. In a case where the consensus queue Qc does not contain any consensus messages cm that have at least a majority $((n/2)+1)$ of valid detached signatures $DS(\{c,T(p)\})$s, the measured values for that data point type during the time period p are disregarded.

In some embodiments of the invention, each node may send its calculated consensus value and individual detached signature to the outside observer. This would reduce complexity at the cost of increased network usage when reporting the calculated consensus values to the outside observer. As such, this mechanism would likely be preferred when the computing power of the nodes is at a premium and the network link between the system of nodes and the outside observer is sufficiently capable.

In some embodiments of the invention, storing a valid consensus message cm for each data point type requires that a length of the consensus message cm is at least $\{c,T(p)\}+ DS(\{c,T(p)\})*((n/2)-1)$. In some embodiments of the invention, it may be possible to shorten the length of the stored valid consensus message cm to $\{c,T(p)\}+DS(\{c,T(p)\})$ or to remove the consensus queue Qc, while maintaining the outside observer's ability to determine which specific nodes 310 in the system 300 have signed the time stamped consensus value $\{c,T(p)\}$ using an alternative method, such as a Schnorr Threshold Signature. In some embodiments of this invention, MuSig-DN may be used to achieve this.

In some embodiments of the invention, the outside observer may not require the ability to determine which specific nodes have and have not signed any given consensus message, only the number of nodes that have signed it. In these situations, a form of aggregate signatures may be used to drastically reduce the minimum communication throughput requirement. In some embodiments of this invention, BLS aggregate signatures, or Bilinear Maps may be used to specify the number of nodes that have signed the consensus message.

Figure 5:
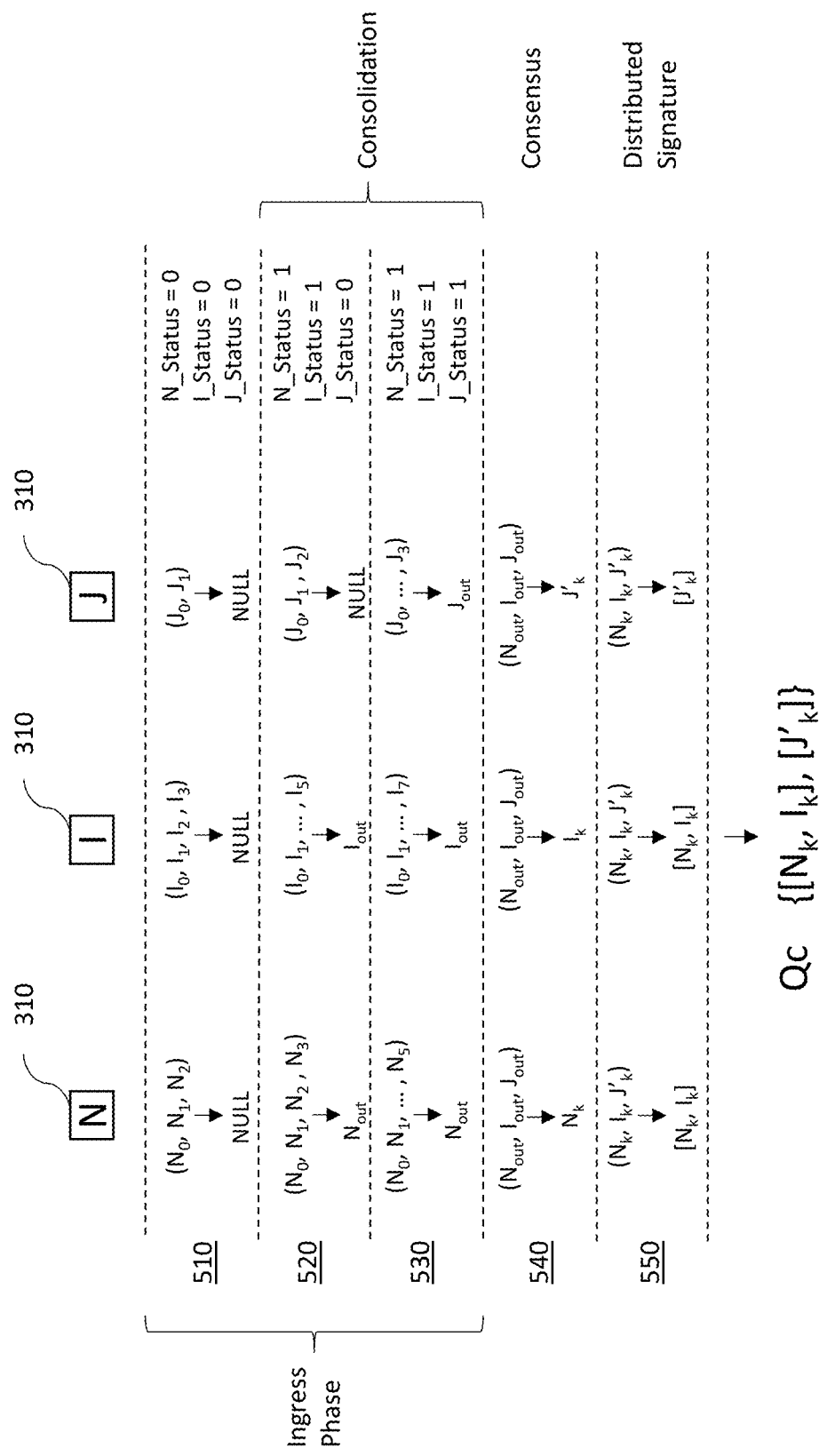
FIG. 5 shows an example of consensus calculation and communication in a fault tolerant communication system, according to embodiments of the invention.

FIG. 5 shows an example of communication and consensus calculation in an exemplar implementation of a distributed computing system using nMR communication. The example system shown in FIG. 5 includes three peer nodes 310, having labels N, I, and J, that are in an active state and receiving a plurality of data points from their respective sensors. In the example shown in FIG. 5, each peer node 310 needs to receive at least a predetermined number of sensor readings (predetermined number of plurality of measurements from the corresponding sensor) before it can generate a consolidated value, which corresponds to all of the values reported by that node's sensor within a specific consolidation time cycle. In the example of FIG. 5, the predetermined number is set to 4, but may be changed to any other number. It is obvious to one of ordinary skill in the art that using a threshold is just one example of predefined criteria to start the process for calculating the consolidated value. Other criteria, such as maximum or minimum time window values, maximum or minimum sensor change values, or other metrics may be used in different embodiments.

In the first time period 510, none of the peer nodes 310 (N, I, J) have received enough sensor readings (measurements) to calculate a consolidated value for transmission to other nodes. Thus, the status of each of the peer nodes 310 remains 0, signifying that none of the peer nodes are able to calculate a consolidated value based on the parameters defined within the chosen consolidator method and, as such, cannot output a consolidated value for their sensor readings to the other peer nodes.

During the time period 520, as the peer nodes 310 continue to receive measurements from their corresponding sensor, peer node N has received 4 readings, peer node I has received 6 readings, and peer node J has received 3 readings. Thus, peer nodes N and I have received enough readings (at least 4, corresponding to the predetermined number for this example) to calculate and transmit their consolidated values. Nodes N and I compute their consolidated values $N_{out}$ and $I_{out}$ and transmit these values to the other nodes ($N_{out}$ being transmitted to nodes I and J and $I_{out}$ being transmitted to nodes N and J). The status of nodes N and I is updated to 1, signifying that nodes N and I meet the predetermined conditions to calculate and output a consolidated value. The status of node J remains at 0.

During the time period 530, all of the peer nodes 310 have received at least 4 measurements from their corresponding sensor. Time periods 520 and 530 correspond to a consolidation phase which at least one peer node is calculating and transmitting a consolidated value. During the consolidation phase, when a new sensor reading is received by an active node (whose status is set to 1), the node computes a new consolidated value to be transmitted to the other peer nodes. For example, during time period 530, node N computes and transmits a consolidated value based on 8 sensor measurements, node I computes and transmits a consolidated value based on 11 sensor measurements, and node J transmits a consolidated value based on 4 sensor measurements. The status of each node is set to 1, which signals the program to start the consensus calculation phase.

The time periods 510-530 correspond to an ingress period during which each of the peer nodes continues to receive and accumulate measurements from the corresponding sensors communicatively connected to the peer nodes. The ingress period ends when all peer nodes are active (for example, when they have received at least a predetermined number of readings to calculate the consolidated value). All peer nodes transmit their consolidated values to the other peer nodes. At this time, in some embodiments, the ingress period may be restarted by resetting the count of received measurements and the status of each peer node to 0.

In some embodiments, each ingress period corresponds to or represents a time slice for calculating a consensus message for the peer nodes. In some embodiments, the calculation of consolidated values and the calculation of consensus messages may be performed by separate processes (threads) executing in in sequence in the peer nodes. Each completion of a consolidated value computation process is followed by a consensus value computation process. In some embodiments, while the consensus value computation process for a first time slice or ingress period is being performed, the consolidated value computation process for the next time slice or ingress period is performed in parallel.

In some embodiments, during the consensus calculation phase 540, each peer nodes receives signed consolidated values from all the other peer nodes. So, in the example shown in FIG. 5, during the consensus calculation phase 540, node N receives signed consolidated values from nodes I and J, node I receives signed consolidated values from nodes N and J, and node J receives signed consolidated values from nodes N and I.

Each peer node then executes a consensus algorithm to calculate a consensus message based on their own consolidated value and the consolidated values received from the other peer nodes. Various statistical measures, such as chi-square or median, may be used to determine the consensus value from the consolidated values. Accordingly, in the example shown in FIG. 5, the peer node N calculates a consensus value $N_k$ based on the consolidated values $N_{out}$, $I_{out}$, and $J_{out}$. Similarly, nodes I and J compute their consensus values $I_k$ and $J_k$. In a case where there is a rogue peer node, the consensus value calculated by the rogue peer node may be wrong. In the example shown in FIG. 5, node J is compromised and calculates an incorrect consensus value $J'_k$.

In some embodiments, in the distributed signature and reporting phase 550, each peer node sends their calculated consensus value $N_k$, $I_k$, or $J_k$ to the other nodes. Each node N, I, or J reviews the consensus values received from the other nodes to identify other nodes that agree with their calculated consensus value. In the example shown in FIG. 5, node N determines that node I has the same consensus value as node N but not node J. Node J determines that none of the other nodes have the same consensus value as node J. Node N computes a consensus message $cm_N$ that includes the consensus value calculated by node N and the distributed signatures of nodes N and I, which both had the same consensus value. Node N then checks the consensus queue Qc to determine whether the consensus message already exists in the queue. In this example, node N is the first to check the consensus queue, and finding it empty, places its consensus message $cm_N$ in the queue Qc for reporting.

Node I computes a consensus message $cm_I$ that includes the consensus value calculated by node I and the distributed signatures of nodes N and I, which both had the same consensus value. Node I then checks the consensus queue Qc to determine whether the consensus message already exists in the queue. In this example, node N has already placed an identical consensus message in the consensus queue; Thus, node I does not report its consensus message out.

Node J computes a consensus message $cm_J$ that includes the consensus value calculated by node J and the distributed signatures of only node J, as not other node had the same consensus value as node J. Node J then checks the consensus queue Qc to determine whether the consensus message already exists in the queue. In this example, node J's consensus message is different from node N's, and is added to the consensus queue Qc for reporting. In the example shown in FIG. 5, the consensus messages $cm_N$ and $cm_I$ are represented as [$N_k$, $I_k$] and the consensus message $cm_J$ is represented as [$J'_k$].

In some embodiments of the invention, the peer nodes may skip the distributed signature and reporting phase 550 and, instead directly report their calculated consensus value to the outside observer/user. These values may be signed by the peer nodes to further enhance system security and trust.

In some embodiments of the invention, it may be unacceptable to continue to accept sensor value (measurements) from malicious or failed sensors or nodes. A historical trend analysis may be conducted to determine the failure mode of discredited nodes (those having measurement values different from the consensus value) and track them over a period of time. In some embodiments of the invention, the sensor measurements for h time periods (a tuneable parameter within the system) may be plotted on a graph of x/p(h). Analysis of the sensor measurements or the plotted graph may be conducted to determine whether any nodes or sensors consistently deviate from the consensus, and by how much. If the measured deviation exceeds a threshold (which could be fixed, user configurable, or automatically adjust over time based on system parameters), the outside observer may be provided with a notification that the node or sensor is untrustworthy. In some embodiments of the invention, the outside observer may initiate a corrective action to attempt to re-sync the sensor/node.

It would be obvious to one of ordinary skill in the art that subsets or combinations of various embodiments described above provide further embodiments. These and other changes can be made to the invention in light of the above-detailed description and still fall within the scope of the present invention. In general, in the following claims, the terms used should not be construed to limit the invention to the specific embodiments disclosed in the specification. Accordingly, the invention is not limited by the disclosure, but instead its scope is to be determined entirely by the following claims.

The invention claimed is:

1. A communication and consensus calculation system comprising:
   one or more computer accessible storage devices configured to store instructions; and
   one or more processors communicatively connected to each other and to the one or more computer accessible storage devices and configured to execute the stored instructions to provide a plurality of processing nodes, each processing node of the plurality of processing nodes being configured to:
   receive a plurality of measurements from a same sensor of a plurality of sensors;
   calculate a consolidated value for the same sensor based on the received plurality of measurements, each calculated consolidated value representing a respective measured value for the same sensor calculated by a respective processing node;
   transmit the consolidated value calculated by the processing node to other processing nodes of the plurality of processing nodes;

receive one or more consolidated values for the same sensor, calculated by one or more of the other processing nodes of the plurality of processing nodes, from the one or more of the other processing nodes of the plurality of processing nodes;

calculate a consensus value for the same sensor based on the calculated consolidated value and the received one or more consolidated values;

transmit the consensus value calculated by the processing node to the other processing nodes of the plurality of processing nodes;

receive one or more consensus values for the same sensor, calculated by the one or more of the other processing nodes of the plurality of processing nodes, from the one or more of the other processing nodes of the plurality of processing nodes;

generate a consensus message based on the calculated consensus value, the received one or more consensus values, and a predefined criterion; and in a case where the consensus message is not present in a consensus queue, add the consensus message to the consensus queue.

2. The system according to claim 1, wherein the plurality of processing nodes is provided by software running on the one or more processors.

3. The system according to claim 1, wherein each processing node of the plurality of processing nodes is further configured to attach signature information identifying the processing node to the calculated consolidated value.

4. The system according to claim 1, wherein each processing node of the plurality of processing nodes is further configured to attach signature information identifying the processing node to the calculated consensus value.

5. The system according to claim 1, wherein each processing node of the plurality of processing nodes is further configured to attach signature information of all processing nodes having a same consensus value as the calculated consensus to the consensus message.

6. The system according to claim 1, wherein each processing node of the plurality of processing nodes is further configured to receive at least a predefined number of measurements from the same sensor before calculating the consolidated value.

7. The system according to claim 1, wherein each processing node of the plurality of processing nodes is further configured to receive at least a predefined number of consolidated values from one or more of the other processing nodes of the plurality of processing nodes before calculating the consensus value.

8. The system according to claim 1, wherein each processing node of the plurality of processing nodes is further configured to receive at least a predefined number of consensus values from one or more of the other processing nodes of the plurality of processing nodes before generating the consensus message.

9. The system according to claim 1,
wherein the predefined criterion is a same consensus value, and
wherein the generated consensus message identifies one or more processing nodes that have the same consensus value.

10. The system according to claim 1, wherein the one or more processors are further configured to execute the stored instructions to identify a processing node of the plurality of processing nodes that does not share a same consensus value as a majority of other processing nodes of the plurality of processing nodes as a faulty processing node.

11. A processor-executable method of calculating and communicating a consensus, the method comprising, for each processing node of a plurality of processing nodes:
receiving a plurality of measurements from a same sensor of a plurality of sensors;

calculating a consolidated value for the same sensor based on the received plurality of measurements, each calculated consolidated value representing a respective measured value for the sensor calculated by a respective processing node;

transmitting the consolidated value calculated by the processing node to other processing nodes of the plurality of processing nodes;

receiving one or more consolidated values for the same sensor, calculated by one or more of the other processing nodes of the plurality of processing nodes, from the one or more of the other processing nodes of the plurality of processing nodes;

calculating a consensus value for the same sensor based on the calculated consolidated value and the received one or more consolidated values;

transmitting the consensus value calculated by the processing node to the other processing nodes of the plurality of processing nodes;

receiving one or more consensus values for the same sensor, calculated by the one or more of the other processing nodes of the plurality of processing nodes, from the one or more of the other processing nodes of the plurality of processing nodes;

generating a consensus message based on the calculated consensus value, the received one or more consensus values, and a predefined criterion; and in a case where the consensus message is not present in a consensus queue, adding the consensus message to the consensus queue.

12. The method according to claim 11, further comprising, for each processing node, attaching signature information identifying the processing node to the calculated consolidated value.

13. The method according to claim 11, further comprising, for each processing node, attaching signature information identifying the processing node to the calculated consensus value.

14. The method according to claim 11, further comprising, for each processing node, attaching signature information of all processing nodes having a same consensus value as the calculated consensus to the consensus message.

15. The method according to claim 11, further comprising, for each processing node, receiving at least a predefined number of measurements from the same sensor before calculating the consolidated value.

16. The method according to claim 11, further comprising, for each processing node, receiving at least a predefined number of consolidated values from one or more of the other processing nodes of the plurality of processing nodes before calculating the consensus value.

17. The method according to claim 11, further comprising, for each processing node, receiving at least a predefined number of consensus values from one or more of the other processing nodes of the plurality of processing nodes before generating the consensus message.

18. The method according to claim 11,
wherein the predefined criterion is a same consensus value, and
wherein the generated consensus message identifies one or more processing nodes that have the same consensus value.

19. The method according to claim 11, further comprising identifying a processing node of the plurality of processing nodes that does not share a same consensus value as a majority of other processing nodes of the plurality of processing nodes as a faulty processing node.

20. A non-transitory computer readable storage medium configured to store a program that executes a method of calculating and communicating a consensus, the method comprising, for each processing node of a plurality of processing nodes:

receiving a plurality of measurements from a same sensor of a plurality of sensors;

calculating a consolidated value for the same sensor based on the received plurality of measurements, each calculated consolidated value representing a respective measured value for the sensor calculated by a respective processing node;

transmitting the consolidated value calculated by the processing node to other processing nodes of the plurality of processing nodes;

receiving one or more consolidated values for the same sensor, calculated by one or more of the other processing nodes of the plurality of processing nodes, from the one or more of the other processing nodes of the plurality of processing nodes;

calculating a consensus value for the same sensor based on the calculated consolidated value and the received one or more consolidated values;

transmitting the consensus value calculated by the processing node to the other processing nodes of the plurality of processing nodes;

receiving one or more consensus values for the same sensor, calculated by the one or more of the other processing nodes of the plurality of processing nodes, from the one or more of the other processing nodes of the plurality of processing nodes;

generating a consensus message based on the calculated consensus value, the received one or more consensus values, and a predefined criterion; and in a case where the consensus message is not present in a consensus queue, adding the consensus message to the consensus queue.

\* \* \* \* \*